J. B. CLANTON & E. A. BEATTY.
WAGON BRAKE.
APPLICATION FILED JULY 19, 1910.
1,002,807.
Patented Sept. 5, 1911.
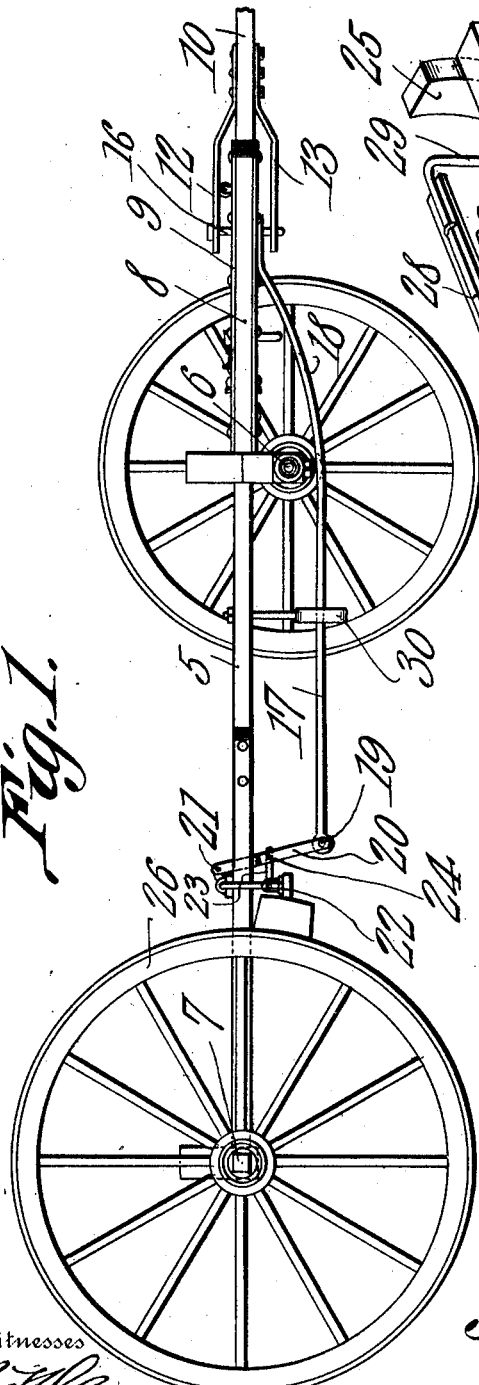
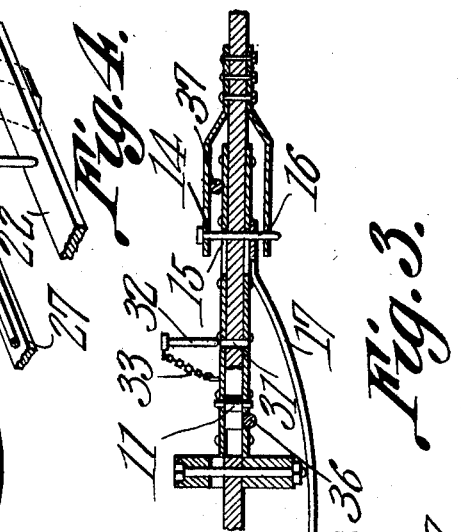
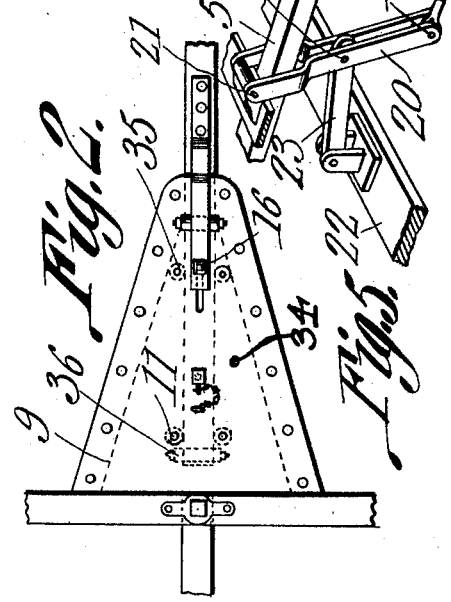
Witnesses
Inventor
John B. Clanton.
Elie A. Beatty, AND
By
Attorney
COLUMBIA PLANOGRAPH CO., WASHINGTON, D. C.

UNITED STATES PATENT OFFICE.

JOHN B. CLANTON AND ELIE A. BEATTY, OF CHARLOTTE, NORTH CAROLINA.

WAGON-BRAKE.

1,002,807. Specification of Letters Patent. Patented Sept. 5, 1911.

Application filed July 19, 1910. Serial No. 572,732.

*To all whom it may concern:*

Be it known that we, JOHN B. CLANTON and ELIE A. BEATTY, citizens of the United States, residing at Charlotte, in the county of Mecklenburg, State of North Carolina, have invented a new and useful Wagon-Brake, of which the following is a specification.

It is the object of the present invention to provide an improved wagon brake of that type designed to be automatically applied when the wagon or other vehicle is traveling down hill.

It is the primary aim of the invention to greatly simplify the structure of such devices so that the same will not be too expensive for use nor too complicated for application to any desired type of vehicle.

With the above and other objects in view, the invention resides in the construction and arrangements of parts, as shown in the accompanying drawings, in which, Figure 1 is a side elevation of an ordinary wagon illustrating the invention applied thereto. Fig. 2 is a plan view of the front hounds of the wagon. Fig. 3 is a vertical longitudinal sectional view therethrough. Fig. 4 is a perspective view of one brake shoe, a portion of its beam, and a portion of its hanger. Fig. 5 is a perspective view of a portion of the brake beam showing the manner in which the brake rod is connected thereto.

In the drawings, the reach of the wagon is indicated by the numeral 5 and connects the front axle 6 and rear axle 7 of the wagon. To the tree for the front axle 6, are secured the front hounds, which are indicated by the numeral 8. Substantially triangular plates 9 are secured one upon the top of the hounds and the other upon the bottom and are thus held spaced, it being understood that these plates close the space between the hounds as well as serving as a means for firmly and relatively bracing the hounds.

The tongue of the wagon is indicated by the numeral 10 and is mounted to slide between the forward ends of the hounds and between the plates 9 secured thereon. Rollers 11 are journaled between the plates in spaced relation and receive between them the rear part of the tongue 10, it being understood that the said tongue may slide forwardly and rearwardly between the said rollers 11 and the forward ends of the hounds. Upper and lower hammer straps 12 and 13 respectively are secured upon the tongue and project respectively rearwardly above and beneath the hounds and the plates 9 thereon, and each of these hammer straps is formed with an opening which is indicated by the numeral 14, and in a vertical plane with these openings the plates 9 are formed with alined slots 15, there being a pin or bolt 16 engaged through the said openings and through the slots. It will be readily understood that the engagement of the pin through the slots and openings serves to limit the forward and rearward sliding movement of the tongue.

A rod 17 is secured at its forward end to the pin 16, as is clearly illustrated in Fig. 3 of the drawings, and is curved to extend downwardly and rearwardly beneath the forward axle 6, as at 18. At its rear end, the rod 17 is pivoted as at 19, between the lower ends of spaced lever arms pivotally suspended as at 21.

A brake beam 22 is suspended from the rear hounds and a link 23 is pivoted at its rear end thereto and at its forward end between the lever arms 20 as at 24. At each end, the brake beam 22 supports a brake shoe 25 of the ordinary type and these shoes coöperate with the rear wheels 26 of the wagon.

A bar 27 is secured upon the rear hounds of the wagon and a hanger shaft 28 is mounted to rock upon this bar and has its end portions depending, as at 29, and connected to the brake beam 23 whereby to support the same for swinging movement. Between its ends, the rod 17 is guided through the bracket 30 which is suspended from the reach 5.

From the foregoing description of the invention it will be readily understood that when the vehicle is traveling down hill the tendency of the horses to hold back will result in the tongue 10 being slid rearwardly whereupon the brake beam 23 will be correspondingly swung, and as a result, the brake shoes will be brought to bear against the tires of the rear wheels 26. When it is desired to back the wagon, it is of course necessary that some means be provided for holding the tongue against rearward movement to apply the brakes, and this means is embodied, preferably, in a pin 32 which is adapted to be engaged through registering openings in the plates 9 and tongue 10. In order to prevent loss of the pin 32, a chain 33 is connected to the same and to the upper plate 9 and when the pin is not in place with the openings 31, it may be inserted in an opening 34 formed in the plates 9. Also, to assist in supporting the tongue 10 for sliding movement between the plates, there are provided, near the front ends of the hounds, rollers which are indicated by the numeral 35 and between which the tongue projects, there being a roller 36 located rearwardly of the roller 11 and journaled in the bottom plate upon the hounds and supporting the rear end of the tongue. In a like manner, a roller 37 is journaled upon the upper plate upon the hounds, and over this roller rides the upper hammer strap 12.

What is claimed is:—

In a brake of the class described, the combination with the rear hounds of a vehicle, the reach, and a sliding tongue, of a bar secured upon the said rear hounds and extending transversely thereof and above the reach between the hounds, a hanger comprising a rod mounted to rock upon the bar and having depending end portions, a brake beam supported at the lower ends of the said end portions of the hanger and extending beneath the hounds and the said reach, brake shoes carried at the ends of the brake beam, a bracket upon the bar at a point between its ends and above the reach, a lever arm having spaced upper end portions pivoted to the bracket and straddling the reach in advance of the bar, a link pivoted to the lever arm beneath the reach and pivoted also to the brake beam, a rod pivoted to the lower end of the lever arm and to the hub, spaced plates between which the tongue is slidably fitted, the said plates being formed with vertically alined slots, a pin secured through the tongue and working in the slots, a hammer strap upon the tongue extending rearwardly above the upper one of the plates and supporting the pin, and a hammer strap upon the underside of the tongue extending rearwardly beneath the lower one of the plates and receiving the lower end of the pin, the said rod at its forward end receiving the said pin and being confined between the said lower one of the plates and the last mentioned hammer strap.

In testimony that we claim the foregoing as our own, we have hereto affixed our signatures in the presence of two witnesses.

JOHN B. CLANTON.
ELIE A. BEATTY.

Witnesses:
H. J. WALKER,
S. C. ROSS.

---

Copies of this patent may be obtained for five cents each, by addressing the "Commissioner of Patents, Washington, D. C."